United States Patent
Bethurum

[11] Patent Number: 5,823,796
[45] Date of Patent: Oct. 20, 1998

[54] AUDIO/POWER JACK FOR IC CARD

[75] Inventor: Gary Cain Bethurum, Laguna Niguel, Calif.

[73] Assignee: ITT Manufacturing Enterprises, Inc., Wilmington, Del.

[21] Appl. No.: 693,821

[22] Filed: Jul. 26, 1996

Related U.S. Application Data

[60] Provisional application No. 60/014,504 Apr. 2, 1996.

[51] Int. Cl.[6] ...................................................... H01R 9/09
[52] U.S. Cl. .......................... 439/76.1; 439/668; 361/737
[58] Field of Search .............................. 439/79, 80, 76.1, 439/668, 946, 946.2; 361/737

[56] References Cited

U.S. PATENT DOCUMENTS

| | | | |
|---|---|---|---|
| 4,082,409 | 4/1978 | Bailey et al. | 339/182 |
| 4,364,625 | 12/1982 | Baker et al. | 339/183 |
| 4,367,907 | 1/1983 | Buck | 339/113 |
| 4,392,708 | 7/1983 | Bailey et al. | 439/668 |
| 4,548,447 | 10/1985 | Dinsmore | 339/14 |
| 4,702,707 | 10/1987 | Hillbish | 439/80 |
| 4,708,415 | 11/1987 | White | 439/59 |
| 4,749,357 | 6/1988 | Foley | 439/80 |
| 4,820,200 | 4/1989 | Lau | 439/668 |
| 5,092,795 | 3/1992 | Kitagawa | 439/668 |
| 5,183,404 | 2/1993 | Aldous et al. | 439/55 |
| 5,277,628 | 1/1994 | Lin et al. | 439/668 |
| 5,336,099 | 8/1994 | Aldous et al. | 439/131 |
| 5,338,210 | 8/1994 | Beckham et al. | 439/131 |
| 5,385,479 | 1/1995 | Okada et al. | 439/144 |
| 5,391,083 | 2/1995 | Roebuck et al. | 439/76 |
| 5,391,094 | 2/1995 | Kakinoki et al. | 439/638 |
| 5,393,249 | 2/1995 | Morgenstern et al. | 439/668 |
| 5,395,268 | 3/1995 | Okada | 439/676 |
| 5,411,405 | 5/1995 | McDaniels et al. | 439/131 |
| 5,423,697 | 6/1995 | MacGregor | 439/638 |
| 5,445,525 | 8/1995 | Broadbent et al. | 439/64 |
| 5,457,601 | 10/1995 | Georgopulos et al. | 361/686 |
| 5,472,351 | 12/1995 | Greco et al. | 439/353 |
| 5,477,426 | 12/1995 | Bethurum | 439/76.1 |
| 5,481,616 | 1/1996 | Freadman | 381/90 |
| 5,493,477 | 2/1996 | Hirai | 361/737 |
| 5,547,397 | 8/1996 | Hirai | 439/946 |
| 5,618,187 | 4/1997 | Goto | 439/79 |

*Primary Examiner*—Gary F. Paumen
*Assistant Examiner*—Tho D. Ta
*Attorney, Agent, or Firm*—Thomas L. Peterson

[57] ABSTRACT

The rear of a thin IC card is provided with a jack (42A, 42B, FIG. 4) that can receive a multi-contact audio type plug (40) having a diameter that is more than half the thickness of the card. The circuit board has a slot (60) that opens into the rear of the card. A U-shaped insulative block (80) is mounted on the card, with the opposite arms of the block lying at opposite sides of the board slot. Sheet metal contacts are mounted on the block and project into the slot in the circuit board, with each contact having a vertically-extending plug-engaging part (120) lying in the circuit board slot. The IC card includes a housing with a rear end cap (140) having a largely cylindrical passage (142A, 142B) that guides an audio-type plug into the slot in the circuit board to engage the contacts thereat. The end cap is constructed to form a rearward extension of the card that projects rearward of a card-receiving host slot, to enable a wide plug handle to be inserted against the rear of the end cap.

13 Claims, 6 Drawing Sheets

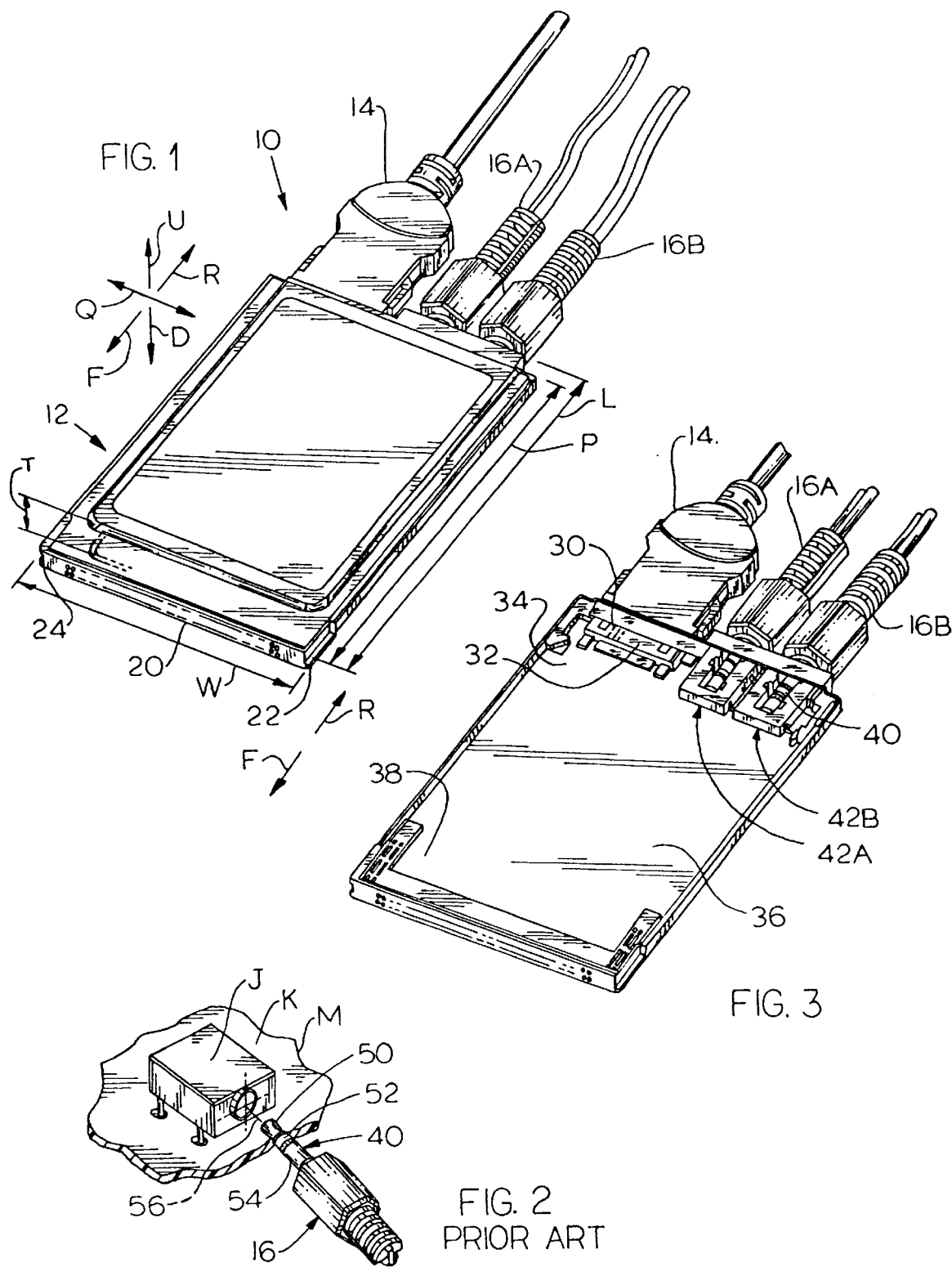

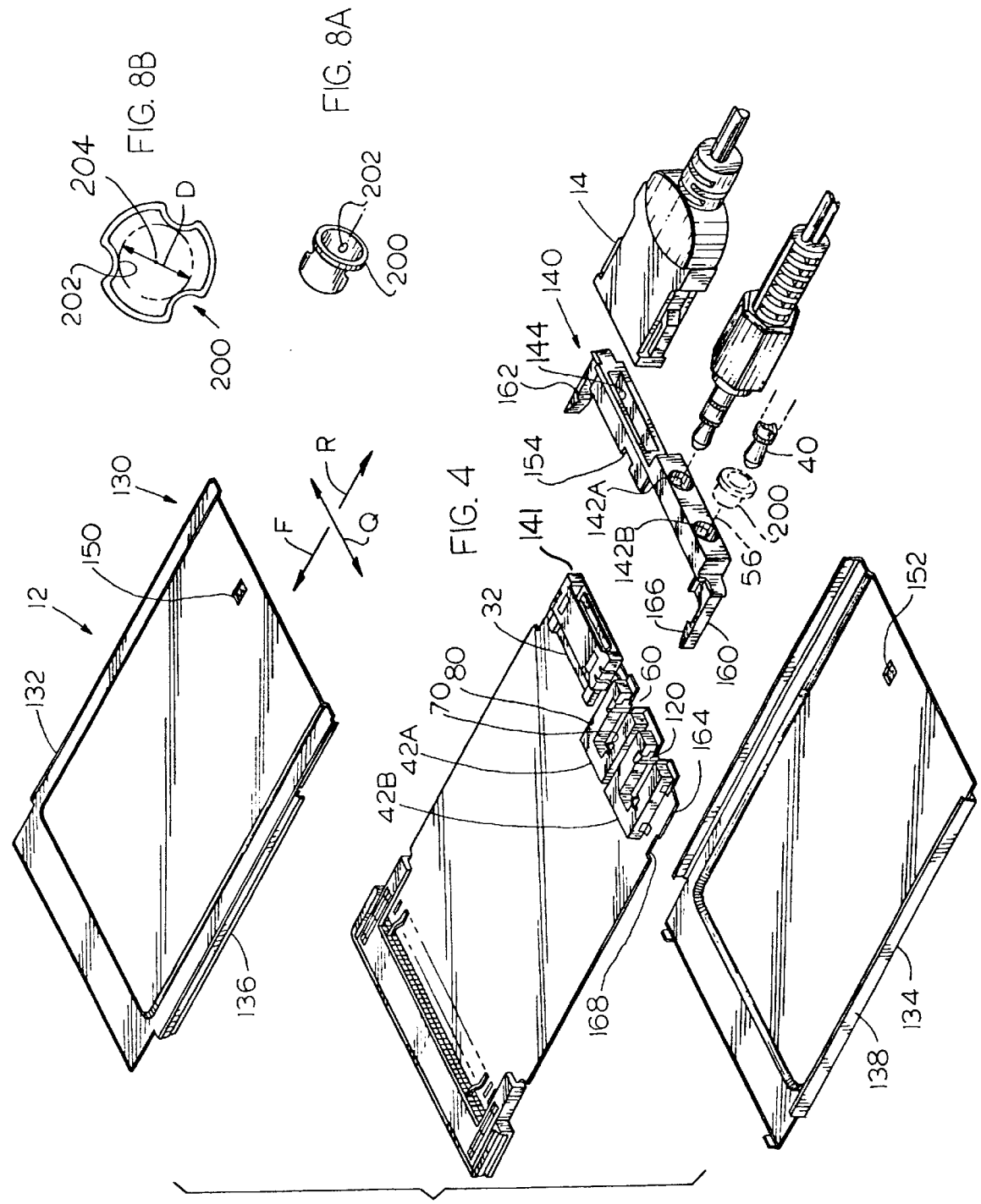

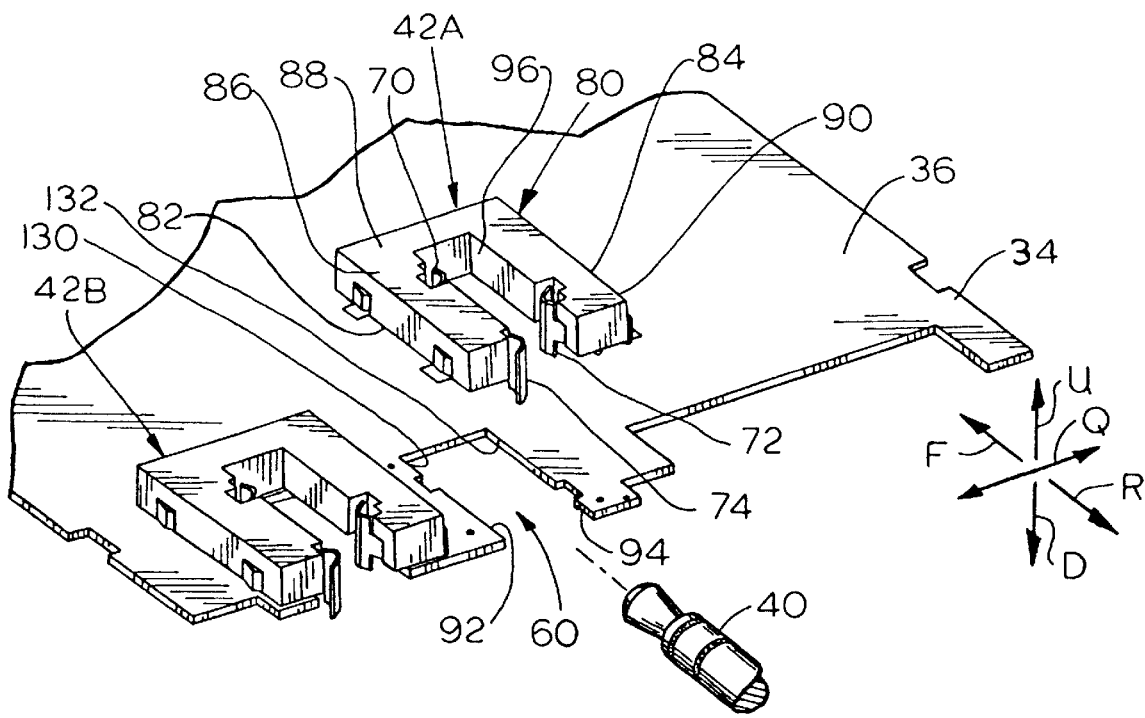
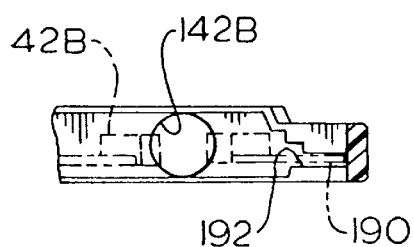
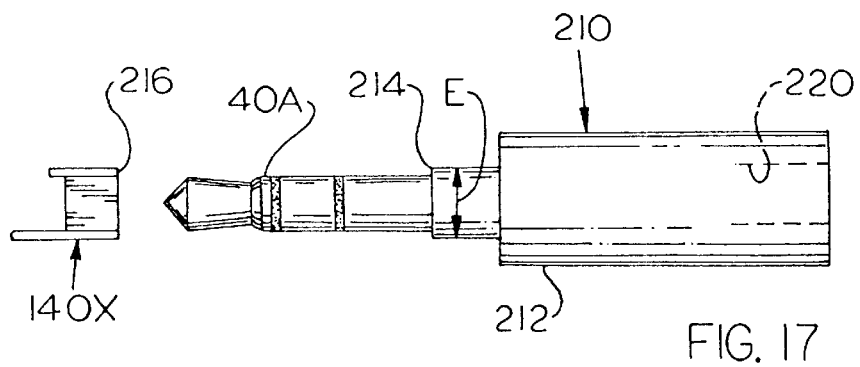

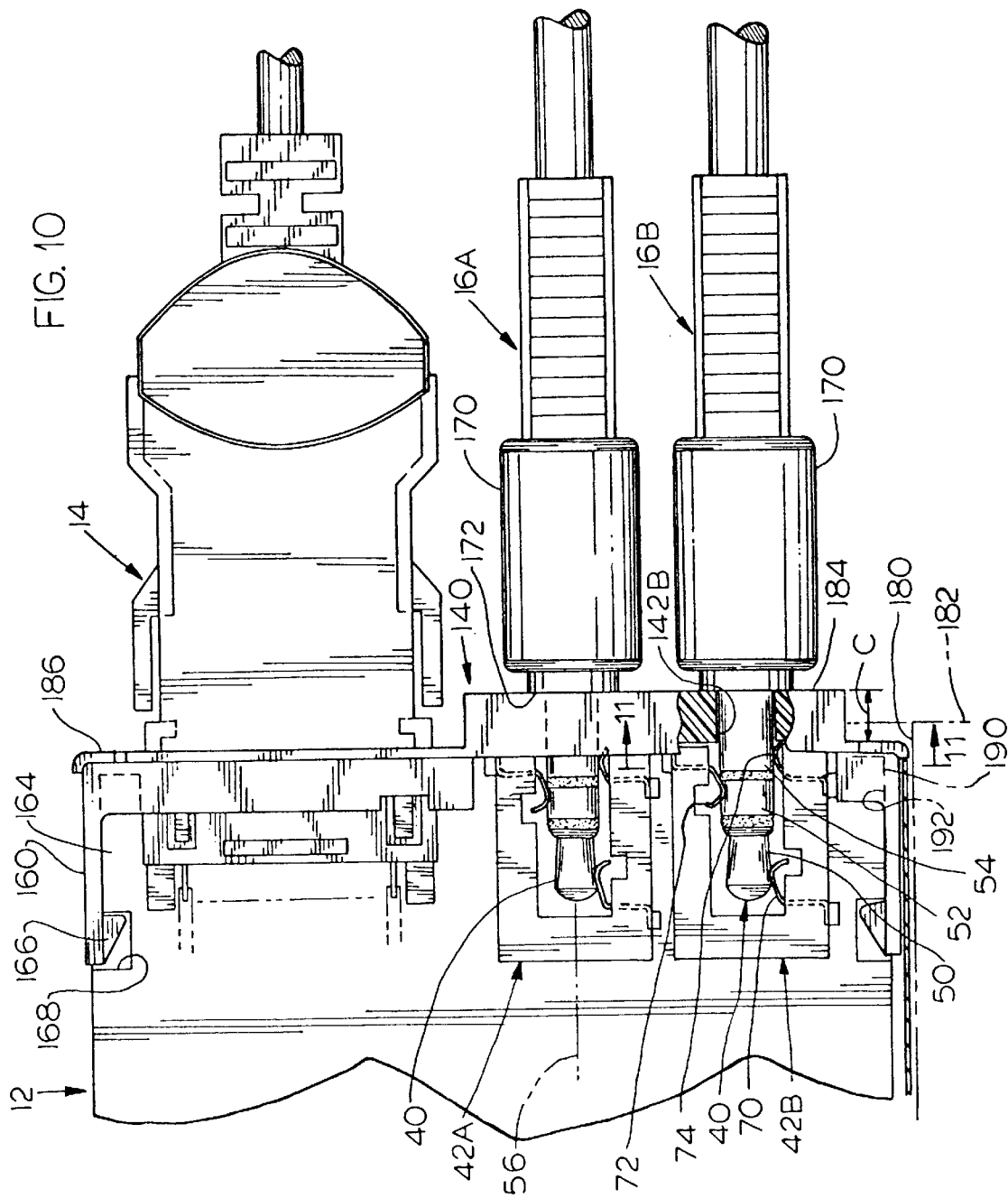

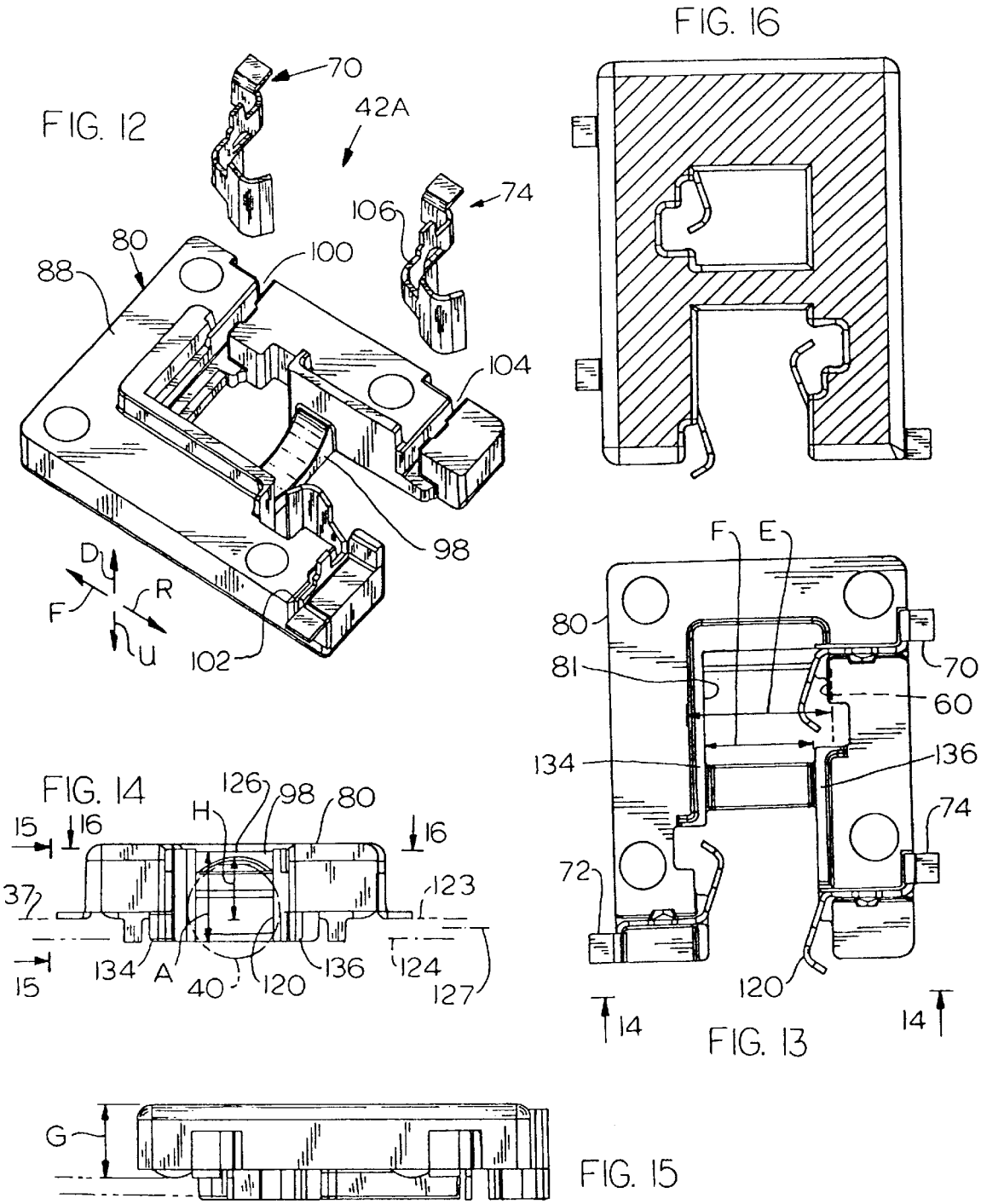

AUDIO/POWER JACK FOR IC CARD

CROSS REFERENCE TO RELATED APPLICATION

This application claims the benefit of U.S. provisional application no. 60/014,504, filed on Apr. 2, 1996.

BACKGROUND OF THE INVENTION

IC cards constructed in accordance with PCMCIA (Personal Computer Memory Card International Association) standards, each have a width of 54 mm and a length of 85.6 mm, with the thickness varying for different types of such cards. The maximum thicknesses of Types I, II and III cards are 3.3 mm, 5 mm, and 10.5 mm. Type II cards, which have a thickness of 5 mm, have been the most popular. Such IC cards were originally designed to store data, and standard IC cards have 68-pin connectors at their front ends for mating with host connectors at the front ends of card-receiving slots. More recent IC cards have been constructed with multi-contact rear connectors, which enable communication between an accessory such as a facsimile machine or modem, and the host, through the card. U.S. Pat. No. 5,411,402 describes one type of such rear connector, which has a row of contacts of about the same thickness as those at the front of the card, with all of such contacts having a thickness of less than 1 mm.

Communications could be established through IC cards by providing such cards with rear connectors that can accept other standard plugs, such as audio plugs. However, many common connectors such as audio plug connectors, have a thickness which approaches that of the standard thickness of 5 mm of the common Type II cards. For example, the most common audio plug connector is in the form of a cylindrical rod of 3.5 mm diameter, with ring-shaped contacts spaced along the length of the rod. Since the inside of the IC card includes a circuit board lying between top and bottom cover portions, there is not much room. Accordingly, it can be difficult to couple thick audio-type connectors to the rear of a standard IC card, especially a Type II card. An arrangement that enabled connection of such large diameter audio-type plug connectors to a thin IC card would enable even more versatile use of IC cards.

SUMMARY OF THE INVENTION

In accordance with one embodiment of the present invention, apparatus is provided for use with a thin device such as an IC card, for receiving and connecting to the axially-spaced contacts of the plug of an audio-type plug connector. The apparatus includes a circuit board mounted in the card or other device, with the circuit board having a slot opening into its rear end. A contact block is mounted on the circuit board and holds a plurality of contacts that project into the slot of the circuit board as seen in a plan view, and preferably also as seen in a rear view wherein the contacts are seen to extend into the plane of the circuit board. The housing includes an end cap with a passage that guides a plug into a position wherein the axially-spaced contacts of the plug engage the contacts on the block.

The block is preferably U-shaped, with a pair of arms lying at opposite sides of the slot and with each arm having a slit that holds a sheet metal contact. Each sheet metal contact has a plug-engaging portion that extends in vertical planes. The end cap preferably extends sufficiently rearward so when the IC card is fully projected into a host slot, the rear of the end cap projects slightly out of the slot. This allows a thick plug handle to lie against the rear of the end cap.

The novel features of the invention are set forth with particularity in the appended claims. The invention will be best understood from the following description when read in conjunction with the accompanying drawings.

BRIEF DESCRIPTION OF THE DRAWINGS

FIG. 1 front and top isometric view of an IC card of the present invention, and showing a lateral plug connector and two audio-type plug connectors connected to the rear of the card.

FIG. 2 is a isometric view of a prior art audio jack and audio plug.

FIG. 3 an isometric view similar to that of FIG. 1, but without the top cover half of the card of FIG. 1.

FIG. 4 is an exploded rear and top isometric view of the IC card of FIG. 1 and of the connectors shown in FIG. 1.

FIG. 8A is a rear isometric view of a plug adaptor shown in FIG. 4.

FIG. 8B is a sectional view of the plug adaptor of FIG. 8A.

FIG. 9 is a simplified rear isometric view of the apparatus shown in FIG. 5, with one of the jacks shown lifted off the circuit board, and without the lateral socket.

FIG. 10 is a plan view of the rear portion of the circuit board of FIG. 3, with the connectors fully mated to the IC card.

FIG. 11 is a view taken on line 11—11 of FIG. 10, with the circuit board and jack shown in phantom lines.

FIG. 12 an exploded bottom isometric view of the second embodiment of the jack of FIG. 6, with the barrier cross member shown in solid lines instead of phantom lines.

FIG. 13 is a bottom view of the jack of FIG. 12.

FIG. 14 is a view taken on line 14—14 of FIG. 13.

FIG. 15 is a view taken on line 15—15 of FIG. 14.

FIG. 16 is a view taken on line 16—16 of FIG. 14.

FIG. 17 is a side elevation view of a plug adaptor constructed in accordance with another embodiment of the invention, shown with a portion of the end cap of FIG. 4.

DESCRIPTION OF THE PREFERRED EMBODIMENTS

Figure 5:
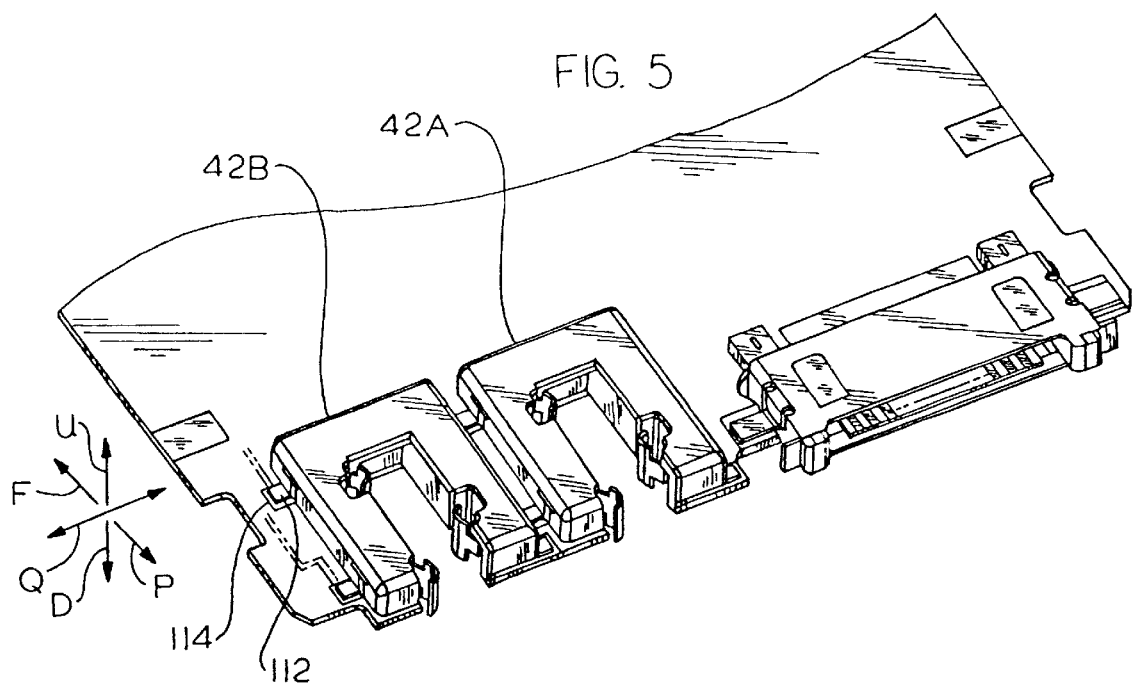
FIG. 5 is an isometric view of a portion of the IC card of FIG. 4, showing the rear portion of the circuit board and the jacks and lateral socket thereof.

FIG. 1 illustrates a combination 10 of an IC card 12 and three plug connectors 14, 16A, and 16B. The IC card 12 is constructed substantially in accordance with PCMCIA standards for a Type II card, in that it has a maximum thickness T of 5 mm, a width W of 54 mm, and a length L which is only slightly greater than the standard length P of 85.6 mm. The card has a multi-contact front connector 20 with 68 contacts, and with polarization keys 22, 24 at opposite sides. Thus, the card can enter a standard PCMCIA host, so its front connector can mate with a host connector. Such host connector normally lies at the front end of a slot in an electronic device such as a laptop computer.

As shown in FIG. 3, connector 14 is a lateral type plug connector that has a row of contacts 30 extending in a lateral direction Q. A lateral rear receptacle connector 32 lies at the rear end portion 34 of a circuit board 36 of the card, which is opposite the front end portion 38 thereof (the front and rear circuit board end portions are spaced in longitudinal directions F, R). However, the other two connectors 16A, 16B are of the audio type, which have largely cylindrical plugs 40 of relatively large diameter. These audio plugs 40 connect to audio jacks 42A, 42B that are mounted on the rear portion of the circuit board.

FIG. 2 shows a prior art audio jack J mounted on the upper surface K of a circuit board M. The plug 40 of the audio connector is in the form of an elongated largely cylindrical rod with ring-shaped contacts 50, 52, 54 spaced along the axis 56 of the plug. The most common type of audio connector has a plug 40 with a nominal diameter of 3.5 mm (it is actually 3.45 mm in diameter). Prior art audio jacks J have a thickness of more than 5 mm, and when mounted on a circuit board lying within a housing, the overall height of the assembly is much more than the limit of 5 mm of Type II IC cards. It is noted that in IC cards, the circuit board is commonly spaced from both top and bottom electrically conductive covers of the card, and if the circuit board M is to be spaced perhaps 1 or 2 mm above a bottom cover portion, then there is certainly not enough room to also mount the prior art jack J in the card.

FIG. 9 shows some details of the audio type jacks 42A, 42B and of the rear portion 34 of the circuit board. In order to accommodate the large diameter plug of an audio-type connector, the circuit board 36 is formed with a slot 60 which opens in a rearward direction R at the rear end of the board. Also, each audio-type jack such as 42A is provided with contacts 70, 72, 74 which extend into the slot circuit board 60 at least as seen in a plan view (looking in the downward direction D), and preferably also as seen in a forward direction F from behind the card. As a result, at least part of the diameter of an audio-type plug 40 can be received in the circuit board slot 60. The audio-type jack 42A includes an insulative block 80 of largely U-shape, with a pair of arms 82, 84 having forward ends 86 joined by a tying cross member 88, and having free rear ends 90. Each of the contacts 70, 72, 74 are mounted on the block. The block is mounted on the circuit board so the arms 82, 84 lie beside opposite sides 92, 94 of the circuit board slot 60, so a slot 96 in the block lies above the circuit board slot 60.

Figure 6:
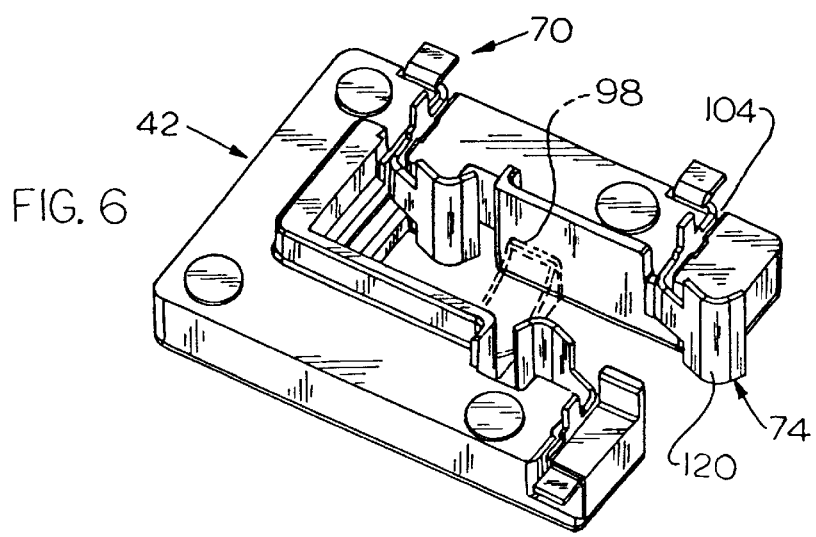
FIG. 6 is a bottom isometric view of a jack of the connector of FIG. 5, and showing in phantom lines, a barrier cross member of another embodiment of the jack.
Figure 7:
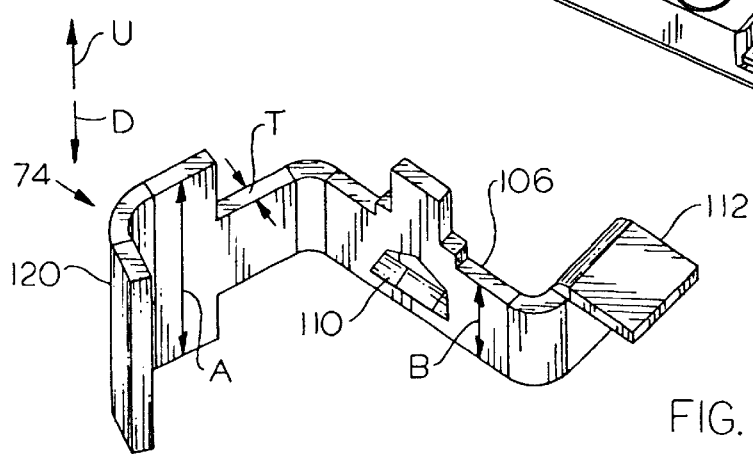
FIG. 7 is a bottom isometric view of one of the contacts of the jack of FIG. 6.

FIG. 12, which is a view of the bottom of jack 42A, shows the particular jack being modified by including a barrier cross member 98, in addition to the tying cross member 88. The entire upper surface of the block (including the area between the arms) can be continuous to aid in block pickup by a vacuum device during assembly. The block 80 has three slits 100, 102, 104 that extend in substantially vertical planes (one or more vertical planes). Each sheet metal contact such as 74 has a mount portion 106 that extends in substantially vertical planes (the plane of the sheet metal extended in a vertical plane before being bent about vertical axes). Each mount portion 106 can be received in a corresponding one of the slits such as 104. As better shown in FIG. 7, the mount portion includes a tang 110 that extends at an incline to the vertical and to the plane of the rest of the mount portion. When the mount portion 106 is forced into a corresponding slit such as 104 shown in FIG. 6, the tang bites into the plastic block and traps the mount portion in the slit. Each contact also has a surface mount termination portion 112 (bent about a horizontal axis and lying in a horizontal plane) that can terminate to a circuit board trace, such as shown at 114 in FIG. 5. Each contact also has a plug-engaging portion 120 for engaging the largely cylindrical plug of an audio-type connector.

The plug-engaging portion 120 extends in vertical planes (i.e. its height in the directions U, D is greater than its thickness T in directions perpendicular thereto) to extend over a considerable height. The vertical height A of the plug-engaging portion is greater than the vertical height B of the mount portion, and both are a plurality of times greater than the sheet metal thickness T. As indicated in FIG. 14, the plug-engaging portion 120 extends into the planes 123, 124 (of the faces) of the circuit board 36 (the board plane 127 is halfway between the faces). Accordingly, even though the plug 40 indicated in FIG. 14 may be positioned somewhat higher or lower than the upper face 37 of the circuit board on which the block 80 lies, the portions 120 can still reliably engage the plug. The barrier cross member 98 has a middle 126 that lies a considerable distance H (1.7 mm) above the circuit board upper plane 123, where H is at least equal to the circuit board thickness.

FIG. 4 shows that the IC card 12 includes a housing 130 comprising top and bottom sheet metal covers 132, 134 with side rails 136, 138 that overlap to lie above and below the circuit board as well as on opposite sides of most of it. The card housing also includes an end cap 140 that is coupled to the covers and that lies at the rear 141 of the housing. The end cap 140 forms passages 142A, 142B for guiding the plugs 40 in projection into the rear of the card and into connection with the jacks 42A, 42B. The end cap 140 also has a passage 144 that passes a portion of the lateral connector 14. It is noted that in FIG. 4, the top and bottom covers are formed with depressions 150, 152 that are received in corresponding recesses 154 in the end cap. The end cap has a pair of forwardly-extending latch arms 160, 162 that extend along edges 164 of the circuit board. The latches have projections 166 at their front ends, that are received in cutouts 168 formed at the laterally opposite sides of the circuit board, to more securely hold the end cap to the circuit board.

FIG. 10 shows the connectors 14, 16A, and 16B mated to connectors at the rear of the IC card 12. The contacts 50, 52, 54 of an audio-type plug 40 are shown engaged with corresponding contacts 70, 72, 74 on each audio jack 42A, 42B. It can be seen that each plug-passing passage such as 142B preferably closely surrounds the rear end of a corresponding plug 40 to control the orientation of the plug, preferably to limit plug tilting upward or downward by no more than about 20° and usually by no more than about 10°.

Each audio-type connector has a handle 170 with a front end 172 of a diameter that is greater than the diameter of the plug 40. The connector such as 16A is normally pushed forwardly until the handle front end 172 abuts a surface so the connector cannot be moved forward anymore. In most common audio connectors, the front end 172 has a diameter that is much more than 5 mm. Accordingly, the front end 172 of the audio connector normally cannot enter a card-receiving slot 180 of an IC card host 182. Most card-receiving slots of card hosts have a length of about 86 to 88 mm, to assure that a fully inserted IC card will have its rear end slightly recessed from the outer surface of the host. Of course, this would mean that the front end 172 of an audio connector handle could not enter the slot and abut the extreme rear end 184 of the cap. This would result in the plug 40 not being fully inserted, so there would not be assurance that all of the plug contacts would engage corresponding jack contacts. To avoid this, applicant constructs the cap 140 so it projects by more than 1 mm, and preferably by a plurality of millimeters such as 4 or 5 mm, rearward of the standard rear surface 186 of the card. The standard IC card rear surface 186 lies a distance of about 85 mm rearward of the front of the front connector. The rearward projection C of the end cap therefore assures that the plugs of the audio connectors 16A, 16B can be fully inserted into the jacks.

When the connector is assembled, and after the jacks are mounted on the circuit board, the end cap 140 is mounted in the position shown in FIG. 10. In this position, circuit board portions 190 which lie at opposite sides of the rear end of the board, enter cap slits 192 formed in the end cap. FIG. 11 shows this situation. The cap slits 192 allow the cap to support the rear end of the circuit board and accurately position the circuit board with respect to the end cap.

Although the most common type of audio connector has a plug of nominally 3.5 mm diameter, there is another, less common standard wherein audio plugs have nominal diameters of 2.5 mm (actually 2.45 mm). FIGS. 8A and 8B show a plug adaptor 200 that can be used to adapt the jacks from a 3.5 mm plug to a 2.5 mm plug. The adaptor 200 has outer walls that are sized to closely fit in an end cap passage, and has inner wall portions 202 which lie on a circle of a diameter D of about 2.5 mm. FIG. 4 shows the adaptor in phantom lines. Where the axis 204 of the inner wall portions 202 are coincident with the axis 56 of the end cap adaptor, the socket contacts are constructed to be deflected a large amount for the 3.5 mm plug, and to be deflected a small amount for the 2.5 mm plug. It is also possible to have an adaptor which positions its axis eccentric to the cap passage axis 56, so a 2.5 mm plug firmly engages only those socket contacts (e.g. 70, 74) on one side of the slot.

FIG. 17 shows another adaptor 210 which can be used with an IC card of the construction shown in FIG. 10, but wherein the rear end 216 of the rear end cap 140X may not project rearward of the usual position of an IC card rear end. The adaptor 210 shown in FIG. 17 includes a plug 40A of nominally 3.5 mm diameter, and has a handle 212 with a front end 214 to abut the rear end 216 of the end cap 140X. The handle front end 214 has a diameter E such as 4.5 mm, that allows it to fit into a 5 mm slot, but still abut the rear end of an end cap whose hole has a diameter of about 3.5 mm. The adaptor has its own passage 220 with three contacts therein that are connected to contacts of the plug 40A. Although this adaptor 210 can avoid the need for the rear end cap to project rearward of the host, it has the disadvantage that it is a separate item that may not be readily available when someone wishes to insert an audio connector into the IC card.

It may be noted that there are other connectors of the same general construction as common audio connectors, including power connectors that carry low voltage (e.g. 9 volts) to power circuitry. Such connectors may have two or three axially-spaced contacts. Jacks similar to those described above can be used for such other connectors. It is also noted that while the jacks shown are especially useful for IC cards, they can be used for other devices that must be thin, to enable the connection of audio-type connectors to them.

In an IC card that applicant has constructed, each circuit board slot 60 (FIG. 13) had a width E of 0.185 inch (4.69 mm). Each block 80 had a slot 81 of a minimum width F of 0.145 inch (3.68 mm). The block is mounted so each block arm overhangs the circuit board slot edges 130, 132 (FIG. 9). The circuit board had a thickness of 0.013 inch (0.33 mm), while each block projected a distance G (FIG. 15) of 0.092 inch (2.33 mm) above the circuit board upper face. Each block included locating projections 134, 136 (FIG. 14) projecting into the circuit board slot. The end cap passage (142B in FIG. 10) had a diameter of 3.52 mm and a length of 3.3 mm (more than half the diameter).

While terms such as "upper", "lower", etc have been used to aid in describing the invention as illustrated, it should be noted that it is possible for the IC card to be used in any orientation with respect to the Earth.

Thus, the invention provides apparatus for receiving and connecting to an audio-type plug which is of largely cylindrical shape with axially-spaced contacts, in a relatively thin space (a thickness no more than substantially twice the plug diameter). A circuit board has a slot extending into its rear edge and a plurality of socket contacts are mounted on the circuit board and project into the slot, at least as seen in a plan view, and preferably also as seen in an end view wherein the plug-engaging portions of the contacts extend into the upper plane of the circuit board. The contacts can be formed of sheet metal and mounted in primarily vertically-extending slots of a thick insulative block that lies beside the circuit board slot. The block can be substantially U-shaped, with each arm extending along an opposite side of the slot and with each arm holding at least one socket contact. A rear end cap has a passage for guiding a plug into engagement with the contacts. The rear end cap preferably projects a plurality of millimeters rearward of the standard length (85.6 mm) of a standard PCMCIA IC card, so that the front of a handle can directly abut the end cap without having to enter a narrow card-receiving slot of a host. The end cap preferably has slits on its opposite sides which receive opposite sides of the rear of the circuit board.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for receiving a multi-contact audio-type plug that has a plug axis, that is designed for insertion along the plug axis, and that has a plurality of axially-spaced plug contacts, comprising:

an apparatus housing having a rear forming an end cap with a plug-passing passage that has a passage axis extending in a predetermined longitudinal direction that is perpendicular to vertical directions;

a circuit board mounted in said housing, said circuit board having a plurality of traces and having a rear end, said circuit board having faces that are normal to said vertical directions;

a plurality of socket contacts each having a termination end directly connected to one of said circuit board traces, with said circuit board having a slot in its rear end and with each of said plurality of socket contacts having a plug-engaging part projecting into said slot as seen in a plan view, with the plug engaging parts of said socket contacts being spaced at least partially along said passage axis to engage said axially-spaced plug contacts, and with said plug-passing passage of said end cap positioned to guide said plug generally into alignment with said slot to engage said plug-engaging parts of said contacts.

2. The apparatus described in claim 1 wherein:

said circuit board has upper and lower faces that lie in corresponding board face planes;

said plug-engaging parts of said socket contacts are formed of sheet metal, and lie in primarily vertical planes when said circuit board lies in a horizontal plane, and extend through said upper board face plane.

3. The apparatus described in claim 1 including:

a contact block of dielectric material which includes a pair of arms lying on opposite sides of said slot in said circuit board, and a cross member connecting said arms, with at least one of said contacts mounted on each of said arms and with said block fixed to said circuit board.

4. The apparatus described in claim 1 wherein:

said slot and said apparatus housing each have a width, in a lateral direction that is perpendicular to said longitudinal direction, and the width of said slot is less than the width of said housing;

the termination ends of a plurality of said socket contacts, each lies at a lateral side of said slot in said circuit board.

5. The apparatus described in claim 1 wherein:

said circuit board and said end cap each having laterally opposite sides, with said end cap having a forwardly-opening cap slit on each of its sides and with each side of said circuit board projecting into a corresponding one of said cap slits.

6. The apparatus described in claim 1 wherein:

said plug-passing passage of said end cap has a diameter of substantially 3.5 mm to closely surround and pass a standard audio-type plug that has an outside diameter of substantially 3.5 mm; and including a plug adaptor which has an outside sized to fit into said plug-passing passage, said plug adaptor having a plug-passing hole with an inside diameter of substantially 2.5 mm to pass a standard 2.5 mm plug, said plug adaptor being out of electrical contact with all of said plug-engaging parts of said socket contacts.

7. An IC card which largely complies with PCMCIA standards that specify a PCMCIA card length of 85.6 mm, a card width of 54 mm, a maximum card thickness for said IC card, and a card front end that is polarized to fit in a PCMCIA host, wherein the card is constructed to receive a multi-contact audio-type plug connector that has a plug axis and a plurality of axially-spaced plug contacts, comprising:

a circuit board having longitudinally-spaced front and rearends and laterally spaced opposite sides;

a front connector connected to the front end of said circuit board;

a sheet metal cover including upper and lower cover halves lying above and below said circuit board;

a plurality of socket contacts mounted on said rear end of said circuit board;

an end cap lying at the rear end of said circuit board and coupled to said sheet metal cover and to said circuit board;

said end cap has a thickness no greater than said maximum card thickness for said IC card and has passage walls forming a longitudinally-extending passage aligned with said socket contacts, with said end cap passage walls extending a distance rearward of said card rear end which is a plurality of millimeters greater than said PCMCIA card length standard of 85.6 mm, whereby to enable full insertion of said plug contacts of said plug connector with a wide handle while the IC card lies in an IC card host that receives the full length of said standard IC card.

8. The IC card described in claim 7 wherein:

said end cap has laterally opposite sides that each has a horizontal slit, with said circuit board rear end having laterally opposite sides that are each received in one of said slits.

9. An IC card comprising:

a circuit board which has longitudinally-spaced front and rear ends, laterally-spaced opposite sides, top and bottom faces, and a board plane lying halfway between said faces, said board rear end having a plurality of traces;

a front connector lying at said board front end;

a plurality of socket contacts each connected to one of said board traces;

a housing which substantially surrounds said circuit board, including sheet metal portions that lie above and below said circuit board and a rear end cap with cap portions that lie rearward of said circuit board;

said plurality of socket contacts have termination ends directly connected to said traces on said board and have plug-engaging parts that are spaced about and along a longitudinally-extending plug axis that extends near said board plane, with said end cap having a passage lying on said plug axis and formed to pass a substantially cylindrical plug with axially spaced plug contacts to engage said plug-engaging parts of said socket contacts.

10. The IC card described in claim 9 including:

an audio-type connector having a substantially cylindrical plug with an axis, said plug having a diameter of substantially 3.4 to 3.5 millimeters, and having a plurality of axially spaced plug contacts;

said plug projecting through said passage in said end cap and with each of said plug contacts engaged with a different one of said socket contacts.

11. The IC card described in claim 9 wherein:

said circuit board has a rearwardly-opening slot in said board rear end, and said plug-engaging parts lie in said slot, with said socket contacts projecting from opposites of said slot into said slot.

12. Apparatus for receiving a multi-contact audio-type plug that has a plug axis and a plurality of axially-spaced plug contacts, comprising:

an apparatus housing having a rear forming an end cap with a plug-passing passage;

a circuit board mounted in said housing, said circuit board having a plurality of traces and having a rear end;

a plurality of socket contacts each having a termination end connected to one of said circuit board traces, with said circuit board having a slot in its rear end and with each of said plurality of socket contacts having a plug-engaging part projecting into said slot as seen in a plan view, and with said plug-passing passage of said end cap positioned to guide a plug generally into alignment with said slot to engage said plug-engaging parts of said contacts;

a contact block mounted on said circuit board and having an arm lying beside said slot;

said contacts being formed of sheet metal with each contact having a sheet metal contact mount part lying primarily in a vertical plane when said circuit board lies in a horizontal plane;

said block having a thickness which is greater than the thickness of said circuit board and said block having a plurality of slits that each holds one of said contact mount parts.

13. Apparatus for receiving a multi-contact audio-type plug that has a plug axis and a plurality of axially-spaced plug contacts, comprising:

an apparatus housing having a rear forming an end cap with a plug-passing passage;

a circuit board mounted in said housing, said circuit board having a plurality of traces and having a rear end;

a plurality of socket contacts each having a termination end connected to one of said circuit board traces, with said circuit board having a slot in its rear end and with each of said plurality of socket contacts having a plug-engaging part projecting into said slot as seen in a plan view, and with said plug-passing passage of said end cap positioned to guide a plug generally into alignment with said slot to engage said plug-engaging parts of said contacts;

a contact block which includes a pair of arms lying on opposite sides of said slot in said circuit board, and a cross member connecting said arms, with at least one of said contacts mounted on each of said arms and with said block fixed to said circuit board;

said block has a top and a bottom and said cross member includes a barrier member lying above the middle of the height of said block and rearward of part of at least one of said contacts, to limit upward movement of the plug above said circuit board.

\* \* \* \* \*